United States Patent [19]

Spring et al.

[11] 4,303,614

[45] Dec. 1, 1981

[54] DISTILLING UNIT

[75] Inventors: Arthur Spring; Arthur Baehr, both of Flawil, Switzerland

[73] Assignee: Buchi Laboratoriums-Technik AG, Flawil, Switzerland

[21] Appl. No.: 145,883

[22] Filed: May 1, 1980

[30] Foreign Application Priority Data

May 2, 1979 [CH] Switzerland ............... 4116/79

[51] Int. Cl.³ ................................... B01L 11/00
[52] U.S. Cl. .................... 422/101; 137/217; 203/DIG. 2; 422/103
[58] Field of Search ............. 203/DIG. 2, 22; 252/180; 422/101, 103, 280, 281; 137/217

[56] References Cited

U.S. PATENT DOCUMENTS

| | | | |
|---|---|---|---|
| 1,104,869 | 7/1914 | Bowser | 137/217 |
| 2,573,807 | 11/1951 | Piros et al. | 203/DIG. 2 |
| 2,891,565 | 6/1959 | Mackey | 137/217 |
| 3,103,471 | 9/1963 | Asami | 203/DIG. 2 |
| 3,219,551 | 11/1965 | Carel et al. | 203/DIG. 2 |
| 4,098,581 | 7/1978 | Kraft et al. | 422/101 |

FOREIGN PATENT DOCUMENTS

| | | |
|---|---|---|
| 7302127 | 4/1973 | Fed. Rep. of Germany . |
| 388761 | 10/1973 | U.S.S.R. ............... 422/101 |
| WO80/01108 | 5/1980 | PCT Int'l. Appl. . |

OTHER PUBLICATIONS

Büchi 325/345/430 Kjeldahl Method–Nitrogen Deter. Systems (Product Bulletin).

Primary Examiner—Michael S. Marcus
Attorney, Agent, or Firm—William R. Hinds

[57] ABSTRACT

A distilling unit for distilling a sample wherein the distillate is passed in a closed system into a receiver, comprises a heatable distilling vessel, a spray or splash protection means, a condenser and a distillate discharge pipe which dips into liquid in the receiver. In order to ensure that, when the distilling operation is interrupted after a predetermined period of time, the liquid is not sucked back into the apparatus by the vacuum which is formed, the distillate discharge pipe has a non-return valve which vents the apparatus when there is the slightest reduced pressure. In this way, the conventional support plate no longer has to be lowered by expensive lifting means, as hitherto.

5 Claims, 2 Drawing Figures

DISTILLING UNIT

FIELD OF THE INVENTION

This invention relates to a distilling unit, forming a closed system at least during the distilling operation, comprising a distilling arrangement and a distillate discharge pipe which opens into a liquid distilling receiver and which dips thereinto.

BACKGROUND OF THE INVENTION

Distilling units of this kind are used for the most widely varying analyses in laboratories. The system, being closed during the distilling operation, is particularly important when substances which are gaseous or which evaporate quickly are to be bonded or combined by the distilling receiver. The invention will be described hereinafter with reference to a distilling unit for determining nitrogen in samples of milk, by direct distillation. However, apparatus according to the invention can be used for any distillation unit of the kind indicated.

Determining nitrogen by direct distillation is based on the fact that a sample, upon being boiled in alkaline solution, gives off ammonia. The major proportion of the ammonia originates from the rapid hydrolysis, which is concluded after a few minutes, of the albumin components, glutamine and asparagine. This fact makes it possible to determine experimentally the relationship between total nitrogen or protein respectively and the ammonia nitrogen which is liberated upon boiling in an alkaline solution. The whole analysis operation is reduced, by virtue of such direct distillation, to the following steps: introduction by means of pipette, dilution, alkaline ajustment, distillation, titration and calculation. It is important however that the distillation time is strictly observed and that the distillate discharge pipe is immersed into the receiver so that even gaseous ammonia components are combined in the distillate receiver.

When the distilling operation is stopped, there occurs a reduced pressure which, when the distillate discharge pipe is immersed, has the result that the distillate is sucked back into the distilling vessel. In order to avoid this, the receiver with the distillate must be removed precisely after the predetermined distilling time, before distillation is interrupted.

Equipment is already known for substantially automating the distillation operation, in order to achieve the most rational sample processing possible. With such equipment, after the preset distillation time has expired, the distilling receiver is automatically lowered before the distillation operation is interrupted. This mode of operation reliably prevents the distillate from being drawn back into the distilling vessel. However, this equipment suffers from the disadvantage that the lifting means and the electronic control arrangement which is required for that purpose is costly and complicated. The lifting mechanism is also liable to trouble and requires careful maintenanee and care.

SUMMARY OF THE INVENTION

An object of the present invention is therefore to provide a distilling unit of the kind referred to which eliminates in the simplest possible manner the danger of the distillate being sucked back after the distilling operation is interrupted, and which does not require expensive mechanical and electronic lifting and control means. According to the invention, the distillate discharge pipe is provided with a non-return valve for venting the closed system. In this way, distillation is interrupted without the distilling receiver having to be lowered at all. The apparatus will be vented when there is just a low degree of reduced pressure so that it is no longer possible for the distillate to be sucked up. In the distilling operation itself however, the system remains closed so that, particularly at the beginning of the distillation operation, even gaseous components cannot escape into atmosphere but are passed to the distilling receiver.

In one embodiment of the invention the non-return valve is a ball valve which is connected to the distillate discharge pipe and comprises a vertical, substantially cylindrical valve housing having a valve opening at its lower end which is closed by the ball by the force of gravity. A non-return valve of this kind is extremely simple in construction and nonetheless operates reliably and accurately. It will be appreciated however that other kinds of non-return valves are also possible, for example, a plate is spring-biassed against the valve opening.

The valve housing and the distillate discharge pipe may be made of glass and integrally connected together to form a single component so that there is no longer any necessity for assembly operations. Manufacture of a glass component of this kind does not give rise to any problems for a skilled glass blower and such a component may be manufactured cheaply. This construction also ensures that, for example, when replacing a defective distillate discharge pipe, the non-return valve is incorporated in the replacement assembly, and does not have to be fitted or adjusted to begin with. This virtually excludes the possibility of operator errors.

The ball valve is particularly resistant if it is made from agate. This material can be satisfactorily ground and ensures a satisfactory seal. Agate is also resistant to acids so that the valve ball cannot suffer damage when acid penetrates into the valve housing. Instead of agate however, it is also possible to use other materials such as Teflon, high-quality steel and the like.

To prevent liquid from penetrating into the valve housing, the connecting conduit between the distillate discharge pipe and the ball valve may have an upwardly directed curved portion and open into the distillate discharge pipe at a position above the opening of a distillate feed conduit pushed into the distillate discharge pipe. With this arrangement, the distillate is guided past the position at which the connecting conduit opens into the distillate discharge pipe so that no penetration into the valve housing can occur, even when the distillate discharge pipe is in an inclined position. In order to ensure that distillate components cannot penetrate into the valve housing, the connecting conduit has an upwardly curved arcuate portion.

It will be seen that the weight of the valve ball must be less than the weight of liquid in the distillate discharge pipe, corresponding to the volume below the position of entry. It is only in this way that the arrangement ensures that the apparatus is vented before the liquid distilling receiver can flow back into the apparatus, with the distillate. The weight of the gate ball however is so low that a pressure compensating action is produced when there is just a very low degree of reduced pressure or when the liquid begins to rise in the distillate discharge pipe.

DESCRIPTION OF A PREFERRED EMBODIMENT

Figure 1:
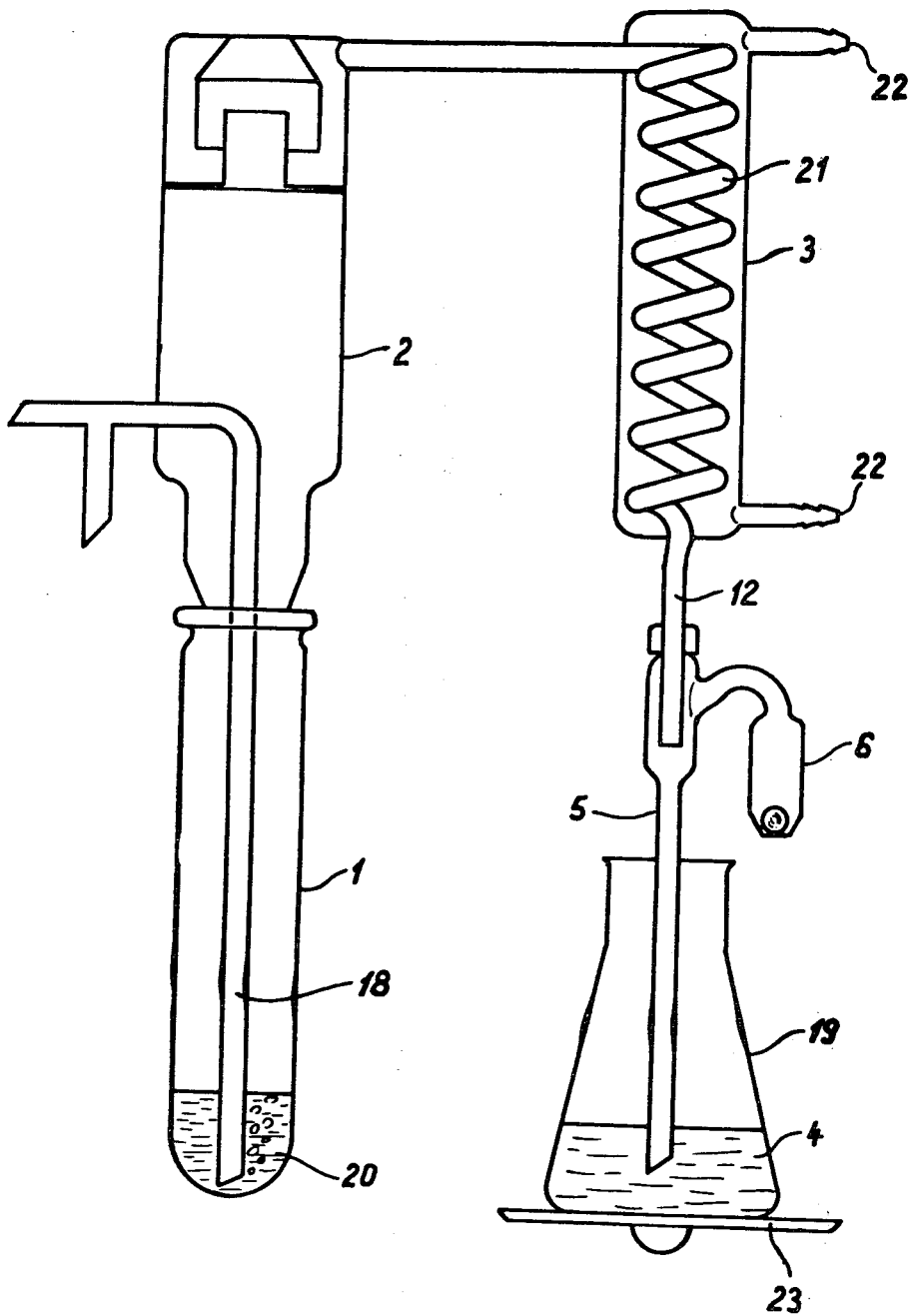
FIG. 1 is a diagrammatic view of one form of distilling unit according to the present invention.

As shown in FIG. 1, the previously prepared sample 20 is disposed in the distilling vessel 1 which is connected to a spray or splash protecting means 2. An inlet pipe 18 dips into the sample 20, down to the bottom of the distilling vessel 1, and performs various functions. By using the pipe 18, the sample can firstly be prepared by feeding in distilled water and soda lye from storage containers. The pipe 18 is then used for introducing water vapour for distillation of the sample 20. Taking into account the calculated delay periods, the production of water vapour is controlled by means of a timing relay so that distillation takes place only for a given period of time.

The vapour rising out of the distilling vessel is passed to a condenser 3 by way of the splash protection means 2. The condenser 3 is provided with cooling water connections 22 and a cooling coil 21 of conventional kind. The condensed distillate passes by way of a distillate feed pipe 12 into the distillate discharge pipe 5 which dips into the distilling receiver 4 in the Erlenmeyer flask 19. The distilling receiver 4 may comprise for example a sulphuric acid or a boric acid solution. The Erlenmeyer flask 19 stands on a receiver plate 23 which can be swung down or away.

Under pressure equilibrium or excess pressure conditions, the non-return valve 6 is closed. This ensures that the system is closed during the distilling operation, because the distillate discharge pipe 5 dips into the distilling receiver 4. Ammonia components which are blown in gaseous form through the distillate discharge pipe 5 at the beginning of the distilling operation cannot escape to atmosphere but are immediately combined by the distilling receiver 4. This eliminates analysis errors in the subsequent operation of titrating the distilling receiver 4. If the distilling operation is interrupted after a predetermined period of time, without any pressure compensation being provided, a vacuum is immediately formed in the system, which results in the distilling receiver being sucked in. In conventional distilling units therefore, the plate member 23 is automatically lowered directly before the distilling operation is interrupted. In simpler kinds of equipment, the receiver was removed manually. The apparatus according to the invention totally eliminates this operation as the non-return valve itself opens immediately when there is a slight reduced pressure in the distilling system, and produces pressure equilibrium.

Figure 2:
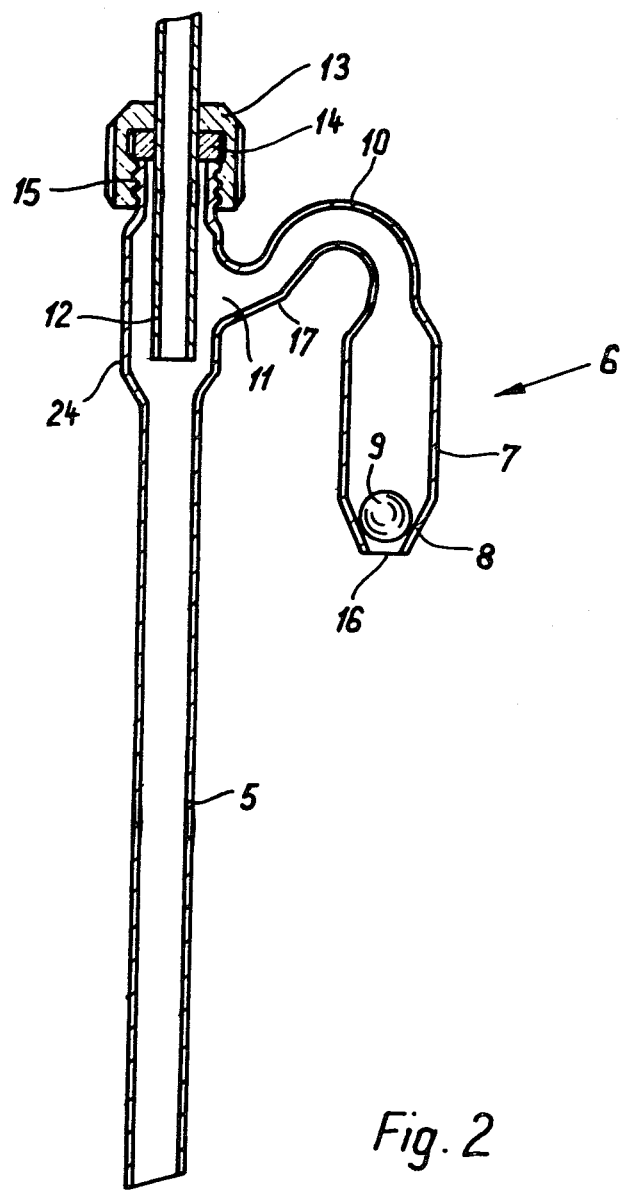
FIG. 2 is a cross-section through a distillate discharge pipe with non-return valve.

As shown in FIG. 2, the non-return valve 6 is integrally connected to the distillate discharge pipe 5. It will be appreciated however that it would also be possible for the non-return valve to be a separate component which could be connected to the distillate discharge pipe. The non-return valve 6 comprises a substantially cylindrical valve housing 7 whose side wall tapers downwardly, in a substantially conical configuration, towards a valve opening 16. A valve seat 8 is ground into the valve housing at the tapered constriction portion. The valve ball 9 closes the valve when pressure equilibrium conditions obtain and in the event of any excess pressure originating from the distillate discharge pipe 5. The connecting conduit 17 between the non-return valve 6 and the distillate discharge pipe 5 has an upwardly directed curved portion 10. The curved portion 10 ensures that distillate components cannot penetrate into the valve. The distillate feed pipe 12 at the cooler side is pushed deep into the somewhat enlarged portion 24 of the distillate discharge pipe 5, as illustrated. The opening of the distillate feed pipe 12 is below the position 11 at which the connecting conduit 17 opens into the enlarged portion of the discharge pipe. This arrangement is also provided to ensure that distillate cannot penetrate into the non-return valve. The upper end of the distillate discharge pipe 5 is provided with a screw thread 15 so that a seal 14 can be pressed on to the upper mouth opening of the pipe, by means of a cap nut 13. In this way, the distillate feed pipe 12 is gas-tightly connected to the distillate discharge pipe 5.

With the apparatus according to the invention, automatic or manual downward movement of the receiver 4 is no longer necessary. The distilling unit can thus be substantially simplified, without safety or reliability of the apparatus being detrimentally affected in any way. Provision of the non-return valve on the distillate discharge pipe 5 does not involve any substantial increase in manufacturing costs, and the cost of the valve is extremely low, compared to that of the expensive electromechanical and electronically controlled lowering means. The non-return valve with the distillate discharge pipe 5 may be easily cleaned, by virtue of its simplicity of construction, and if necessary can be immediately replaced without taking the distilling unit out of operation for a prolonged period. It will be seen that other configurations, in particular in respect of the valve housing 7 and the connecting conduit 17, are also possible, without thereby departing from the subject-matter of the present invention. If necessary, non-return valves other than the ball valve illustrated, can be used to perform the same function.

We claim:

1. A distilling unit forming a closed system at least during the distilling operation, comprising a heatable distilling vessel, a distillate receiver, a condenser, and a distillate discharge pipe constructed and arranged to open into and dip into liquid in said distillate receiver, said distillate discharge pipe being connected with a ball valve for venting the closed system, said ball valve comprising a vertical, substantially cylindrical valve housing with a valve opening disposed at its lower end closed by the ball by the force of gravity, and a conduit connecting the distillate discharge pipe and the ball valve, said conduit having an upwardly directed curved portion.

2. A distilling unit as defined in claim 1, wherein said valve housing, said connecting conduit, and said distillate discharge pipe are made of glass and are integrally connected together.

3. A distilling unit as defined in claim 1, wherein the ball of said ball valve is made from agate.

4. A distilling unit as defined in claim 1, wherein said upwardly directed curved portion of said conudit opens into the distillate discharge pipe at a position above the opening of a distillate feed conduit into the distillate discharge pipe.

5. A distilling unit as defined in claim 4, wherein the weight of the valve ball member is less than the weight of fluid in the distillate discharge pipe corresponding to the volume below the position of entry.

* * * * *